United States Patent
Bailiang (10) Patent No.: US 8,984,445 B1
(45) Date of Patent: Mar. 17, 2015

(54) SYSTEM AND METHOD FOR GEO-LOCATING IMAGES

(71) Applicant: Google Inc., Mountain View, CA (US)

(72) Inventor: Zhou Bailiang, Balgowlah (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/169,438

(22) Filed: Jan. 31, 2014

(51) Int. Cl.
*G06F 3/048* (2013.01)
*G06F 3/0481* (2013.01)
*G06F 3/0484* (2013.01)
*G01C 21/36* (2006.01)
*G06F 3/0486* (2013.01)

(52) U.S. Cl.
CPC ........ *G06F 3/04817* (2013.01); *G06F 3/04812* (2013.01); *G06F 3/04842* (2013.01); *G01C 21/3682* (2013.01); *G01C 21/367* (2013.01); *G06F 3/04845* (2013.01); *G06F 3/0486* (2013.01)
USPC ........... 715/846; 715/769; 715/712; 715/818; 701/409; 701/445; 701/450; 701/454; 701/532

(58) Field of Classification Search
CPC .............. G01C 21/3682; G01C 21/367; G06F 3/04817; G06F 3/0486; G06F 3/04812; G06F 3/04845; G06F 3/04842
USPC .......... 715/846, 712, 818, 855; 701/409, 445, 701/450, 454, 532
See application file for complete search history.

(56) References Cited

U.S. PATENT DOCUMENTS 6,363,392 B1 * 3/2002 Halstead et al. ...................... 1/1
7,461,345 B2 * 12/2008 Lettau ........................... 715/738
2010/0293508 A1 * 11/2010 Hwang et al. .................. 715/846
2011/0054776 A1 * 3/2011 Petrov et al. ................... 701/201
2012/0030594 A1 * 2/2012 Yokoyama et al. ........... 715/765

OTHER PUBLICATIONS

LoCascio, Ted. My Adobe Photoshop Lightroom 4. Chapter 12. Que Publishing, 2012.*
Kelby, Scott. The Adobe Photoshop Lightroom 4 Book for Digital Photographers. Chapter 2. Peachpit Press, May 4, 2012.*
Evening, Martin. The Adobe Photoshop Lightroom 4 Book: The Complete Guide for Photographers. Chapter 10. Peachpit Press, 2012.*
Williams, Juliana, and Andreas Neumann. "Interactive Hiking Map of Yosemite National Park." Proceedings of the 22nd International Cartographic Conference, A Coruña (CD-ROM). 2005.*
http://tv.adobe.com/watch/whats-new-in-lightroom-4/the-map-module/—2 pages.
http://tv.adobe.com/watch/whats-new-in-lightroom-4-beta/mapping-your-photos/—2 pages.
http://tv.adobe.com/watch/photoshopcafe-tv/lightroom-4-beta-the-map-module-and-gps/—3 pages.

* cited by examiner

*Primary Examiner* — William Bashore
*Assistant Examiner* — James F Sugent
(74) *Attorney, Agent, or Firm* — Dority & Manning, P.A.

(57) ABSTRACT

In one aspect, a computer-implemented method for geo-locating images may generally include receiving, by one or more computing devices, a request to geo-locate an image on a map and, in response to the request, providing for display a user icon on the map. In addition, the method may include determining a current geographic location of the user icon on the map, providing for display a textual representation of the current geographic location, receiving data indicative of the user icon being moved across at least a portion of the map and updating the textual representation of the current geographic location as the user icon is moved across the at least a portion of the map.

16 Claims, 7 Drawing Sheets

SYSTEM AND METHOD FOR GEO-LOCATING IMAGES

FIELD

The present subject matter relates generally to a system and method for geo-locating images on a map and, more particularly, to a system and method for enhancing the ability of a user to geo-locate a photograph or other image on a map by providing a location indicator corresponding to the geographic location of a user icon on the map as such icon is moved across the map in order to select a location for geo-locating the image.

BACKGROUND

Current geo-locating services allow users to drag one or more photos across a map in an attempt to drop the photo(s) on the map at a desired geographic location (e.g., the geographic location at which the photo(s) was taken). Once the photo(s) is dropped onto a selected location on the map, data corresponding to the selected geographic location (e.g., GPS coordinates) is then associated with the image file(s). However, it is often difficult for users to accurately locate the photos on the map. For example, when the map view is significantly zoomed-out, dropping the photos on the map at a location that is only a few pixels away from the desired location may result in the photos being geo-located a substantial distance away from the desired location (e.g., depending on the zoom level, an error of multiple streets or an entire city). Accordingly, users are often required to repeatedly drag and drop the photos on the map to ensure that the photos are associated with the desired location.

SUMMARY

Aspects and advantages of embodiments of the invention will be set forth in part in the following description, or may be obvious from the description, or may be learned through practice of the embodiments.

In one aspect, the present subject matter is directed to a computer-implemented method for geo-locating images. The method may generally include receiving, by one or more computing devices, a request to geo-locate an image on a map and, in response to the request, providing for display a user icon on the map. In addition, the method may include determining a current geographic location of the user icon on the map, providing for display a textual representation of the current geographic location, receiving data indicative of the user icon being moved across at least a portion of the map and updating the textual representation of the current geographic location as the user icon is moved across the at least a portion of the map.

In another aspect, the present subject matter is directed to a system for geo-locating images. The system may include one or more computing devices having one or more processors and associated memory. The memory may store instructions that, when executed by the processor(s), configure the computing device(s) to transmit data associated with presenting a map of a geospatial asset, wherein the map includes a user icon displayed thereon. In addition, the computing device(s) may be configured to determine a current geographic location of the user icon on the map, provide for display a textual representation of the current geographic location, receive data indicative of the user icon being moved across at least a portion of the map and provide for display an updated textual representation of the current geographic location as the user icon is moved across the at least a portion of the map.

In a further aspect, the present subject matter is directed to a tangible, non-transitory computer-readable medium storing computer-executable instructions that, when executed by one or more processors, cause the processor(s) to perform specific operations. The operations may generally include receiving a request to geo-locate an image on a map and, in response to the request, providing for display a user icon on the map. In addition, the operations may include determining a current geographic location of the user icon on the map, providing for display a textual representation of the current geographic location, receiving data indicative of the user icon being moved across at least a portion of the map and updating the textual representation of the current geographic location as the user icon is moved across the at least a portion of the map.

Other exemplary aspects of the present disclosure are directed to other methods, systems, apparatus, non-transitory computer-readable media, user interfaces and devices for geo-locating images.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art, are set forth in the specification, which makes reference to the appended figures, in which:

FIG. 5 illustrates a zoomed-in view of the map shown in FIG. 4, particularly illustrating one example of the geographic entities that may be included within the location indicator when the current zoom level of the map is significantly zoomed-in;

DETAILED DESCRIPTION

Reference now will be made in detail to embodiments, one or more examples of which are illustrated in the drawings. Each example is provided by way of explanation of the embodiments, not limitation. In fact, it will be apparent to those skilled in the art that various modifications and variations can be made to the embodiments without departing from the scope or spirit of the embodiments. For instance, features illustrated or described as part of one embodiment can be used with another embodiment to yield a still further embodiment. Thus, it is intended that the present subject matter cover such modifications and variations as come within the scope of the appended claims and their equivalents.

Overview

In general, the present subject matter is directed to a system and method for geo-locating one or more images. Specifically, the present disclosure provides for a location indicator to be displayed to a user as he/she is moving a user icon (e.g., a mouse icon, an image icon or any other suitable icon) across a map in order to select a desired location for geo-locating an image(s) on the map. In several embodiments, the location indicator may correspond to a textual representation of the current geographic location of the user icon on the map. Thus, the textual representation may be displayed to provide the user a visual indication of the geographic location on the map over which the user icon is currently positioned. As such, by referencing the textual representation as the user icon is moved across the map, the user may accurately select a desired location on the map for geo-locating the image(s).

For example, a user may be currently viewing a map depicting a road network within a large city. If the user desires to geo-locate an image at a particular address on a given street within the city, the user may select the image and move a user icon (e.g., using a mouse, touch screen and/or any other suitable input device) across the map towards the geographic location of the particular address. As the user icon is moved across the map, a textual representation of the current geographic location of the icon on the map may be displayed to the user, such as by displaying both the city name and the street address corresponding to the location over which the user icon is currently positioned on the map. By continuously or periodically updating the textual representation as the user icon is moved across the map, the user may be able to quickly and easily identify when the user icon is positioned over the appropriate street and may be able to further adjust the position of the user icon to find the specific address location along the street. When the textual representation displays the desired street address, the user may provide a suitable user input to select the location (e.g., by releasing a user input button in order to "drop" the image at the location) and the corresponding image may be geo-coded with location data associated with the selected location.

It should be appreciated that the current geographic location of the user icon on the map may often be associated with a hierarchy of geographic entities (e.g., country, state, county, city, street address, etc.). Thus, in several embodiments, the textual representation provided for display to the user may incorporate all or a portion of such entities. Specifically, in a particular embodiment, the geographic entities may be selected for display depending on the zoom level of the current map view. For instance, when the map view is highly zoomed-out (e.g., such that that an entire continent or country may be viewed), only geographic entities at the upper end of the hierarchy may be displayed to the user (e.g., country and state) whereas, when the map view is highly zoomed-in (e.g., such that a specific road and/or road network may be viewed), only geographic entities at the lower end of the hierarchy may be displayed to the user (e.g., city and/or street address).

Additionally, in several embodiments, the textual representation displayed to the user may only be configured to be updated with the current geographic location of the user icon when the speed at which the icon is being moved across the map is below a given speed threshold. For example, if the user is quickly moving the user icon across the map, the textual representation may be held constant at the last updated location at which the icon speed was below the threshold or the textual representation may be removed (or shown blank) until the icon speed is below the speed threshold. In such embodiments, as long as the user icon is being moved at a speed below the threshold, the textual representation may be continuously updated with the current geographic location of the icon on the map.

Moreover, in several embodiments, a visual parameter associated with textual representation displayed to the user may be modified when the user selects the desired location on the map. For example, the color, transparency, font and/or texture of the textual representation may be modified to indicate that the textual representation is presenting information associated with the selected location.

It should be appreciated that the technology described herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer processes discussed herein may be implemented using a single computing device or multiple computing devices working in combination. Databases and applications may be implemented on a single system or distributed across multiple systems. Distributed components may operate sequentially or in parallel.

Example User Interfaces for Geo-Locating Images

Figure 1:
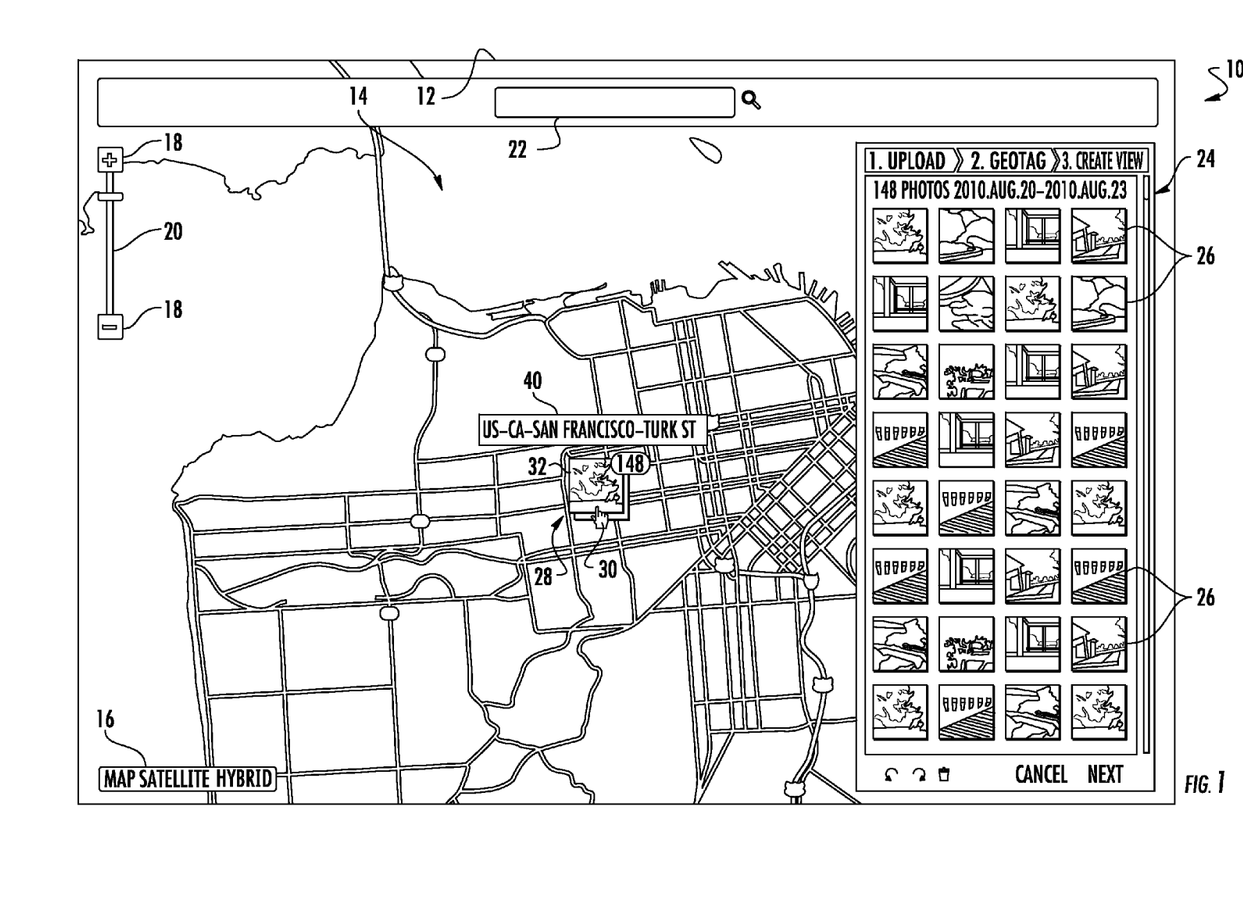
FIG. 1 illustrates an example view of a suitable user interface for displaying a map that allows a user to select a geographic location on the map for geo-locating one or more images, particularly illustrating a user icon presented on the map along with a location indicator providing information associated with the current geographic location of the user icon on the map.

Referring now to the drawings, FIG. 1 illustrates an example user interface 10 that may be presented to a user for geo-locating one or more images. As shown, the user interface 10 includes a display window 12 for presenting a map 14 to the user. The map 14 may be generated from a variety of different data types, such as imagery data, terrain data and/or vector data (e.g., vector representations of roads, parcels, buildings, etc.) and may be made available to the user via any suitable mapping application or other geographic information system (GIS), such as Google Maps or Google Earth provided by Google, Inc. As shown in FIG. 1, one or more map display buttons 16 may be provided within the display window 12 for adjusting the type of map displayed to the user (e.g., a standard map view, a satellite view or a hybrid view including both satellite imagery and road vector data). In addition, one or more zoom buttons 18 (and/or a zoom toolbar 20) may be provided for adjusting the zoom level associated with the current map view. Moreover, a search input bar 22 may be provided (e.g., along the top of the display window 12) to allow the user to search for specific locations or entities on the map.

Additionally, in several embodiments, the user interface 10 may include an image sidebar 24 for displaying an image icon(s) 26 associated with one or more images. For instance, the user may be allowed to select or upload image files associated with images to be displayed within the image sidebar 24. A visual representation of each image (e.g., all or a portion of the image or a generic image with the corresponding image file name) may then be presented to the user via each corresponding image icon 26. Moreover, the user may also be allowed to select one or more of the image icons 26. For example, the user may be allowed to scroll through the image icons 26 displayed within the image sidebar 24 and select one or a group of image icons 26 by providing a suitable user input, such as by clicking on each desired image icon. As will be described below, the image(s) associated with the selected image icon(s) may then be geo-located on the map.

To allow the user to geo-locate the selected image(s), a user icon 28 may be displayed to the user that provides a visual representation of the user's current input location on the map 14. For instance, as shown in FIG. 1, the user icon 28 includes both a pointer icon 30 (e.g., a hand or arrow) and an image icon 32. In such an embodiment, the displayed image icon 32 may, for example, correspond to the image icon (or one of the image icons) selected from the image sidebar 24. Moreover, as shown in FIG. 1, to indicate to the user that multiple images have currently been selected for geo-location on the map, the user icon 28 may include a stacked visual feature in which it appears that two or more image icons 32 are stacked one on top of another and/or the user icon 28 may include a textual representation corresponding to the number of images currently selected (e.g., by displaying the number of selected images at one of the corners of the image icon(s)). However, in other embodiments, the user icon 28 may have any other suitable display format or type configured to provide a visual representation of the user's current input location on the map 14, such as by simply corresponding to a pointer icon or an image icon.

As is generally understood, it should be appreciated that the user icon 28 may be configured to be moved across the map 14 using any suitable input device known in the art that is integrated into or otherwise communicatively coupled to the user's computing device. For instance, the location of the user icon 28 may be controlled via a mouse or mouse pad and/or, for a touch-enabled device, via a touch screen.

As shown in the illustrated embodiment, as the user icon 28 is moved across the map 14, a location indicator 40 including information associated with the geographic location of the user icon 28 on the map 14 may be displayed to the user. In several embodiments, the location indicator 40 may include a textual representation of the geographic location of the user icon 28. Specifically, as shown in FIG. 1, the location indicator 40 may include text corresponding to one or more geographic entities associated with the geographic location of the user icon 28 on the map 14. As used herein, the term "geographic entity" encompasses its plain and ordinary meaning and may generally refer to any suitable geographic identifier that provides information associated with a given geographic region and/or location. For instance, geographic entities may include, but are not limited to, continents, countries, states, provinces, counties, cities, districts, streets, street addresses and/or any other suitable location identifiers that may be utilized to identify a given geographic region and/or location. As will be described below, the specific geographic entities displayed within the location indicator 40 may vary depending on one or more factors, such as any user-defined settings and/or the current zoom level of the map 14.

It should be appreciated that the location indicator 40 may be displayed to the user in any suitable form and at any suitable location relative to the user icon 28. For example, as shown in the illustrated embodiment, the location indicator 40 is displayed as textual information contained within a message window or text box positioned directly above the user icon 28. However, in other embodiments, the location indicator 40 may be displayed without the message window or text box and/or may be positioned at any other suitable location. For instance, the location indicator 40 may be positioned at a different location adjacent to the user icon 28, such as directly below the icon 28, or at any other location within the display window 12, such as along the top or bottom of the window 12 or along one of the sides of the window 12.

In several embodiments, the geographic entities contained within the location indicator 40 may be displayed in a hierarchical order, such as by ordering the entities based on the size of the geographic area defined by each entity. For instance, the geographic entity defining the largest geographic area (e.g., a continent) may be ranked highest and the geographic entity defining the smallest geographic area (e.g., a street address) may be ranked lowest. In such an embodiment, the geographic entities may be display left-to right in descending or ascending order. For instance, as shown in FIG. 1, the geographic entities are displayed within the location indicator 40 in descending order from the left-to-right (e.g., country (US), state (California), city (San Francisco) and street (Turk Street).

As will be described in greater detail below, the location indicator 40 may be continuously or periodically updated as the user icon 28 is moved across the map 14 to provide the user useful information associated with the current location of the icon 28 on the map 14. For instance, in the illustrated embodiment, as the position of the user icon 28 is moved across the portion of the city currently displayed within the display window 12, the location indicator 40 may be adjusted to indicate the name of the street over which the user icon 28 is currently positioned. As such, the user may utilize the location indicator 40 as a visual reference for positioning the user icon 28 at the desired location on the map 14. Once the user icon 28 is positioned at the desired location, the user may provide a suitable user input to select the location, such as by clicking a user input button (e.g., a mouse button), touching the screen or by releasing a user input button (e.g., when performing a "drag and drop" operation). The selected image(s) may then be geo-coded with data associated with the selected geographic location, such as by coding the GPS coordinates of the selected location within the metadata of the image file(s) associated with the image(s).

It should be appreciated that, in addition to the location indicator 40 including one or more geographic entities, or as an alternative thereto, the textual representation provided by the location indicator 40 may include any other suitable text or information that provides the user an indication of the current geographic location of the user icon 28 on the map 14. For example, in one embodiment, the textual representation may simply include GPS coordinates corresponding to the geographic location of the user icon 28 on the map 14.

It should also be appreciated that the user interface 10 shown in FIG. 1 is simply illustrated to provide one example of a suitable interface that may be presented to a user to allow him/her to geo-locate one or more selected images on a displayed map. Thus, one of ordinary skill in the art should readily understand that various other interface types and/or designs may be utilized within the scope of the present subject matter to allow for one or more images to be geo-located.

Example Systems for Geo-Locating Images

Figure 2:
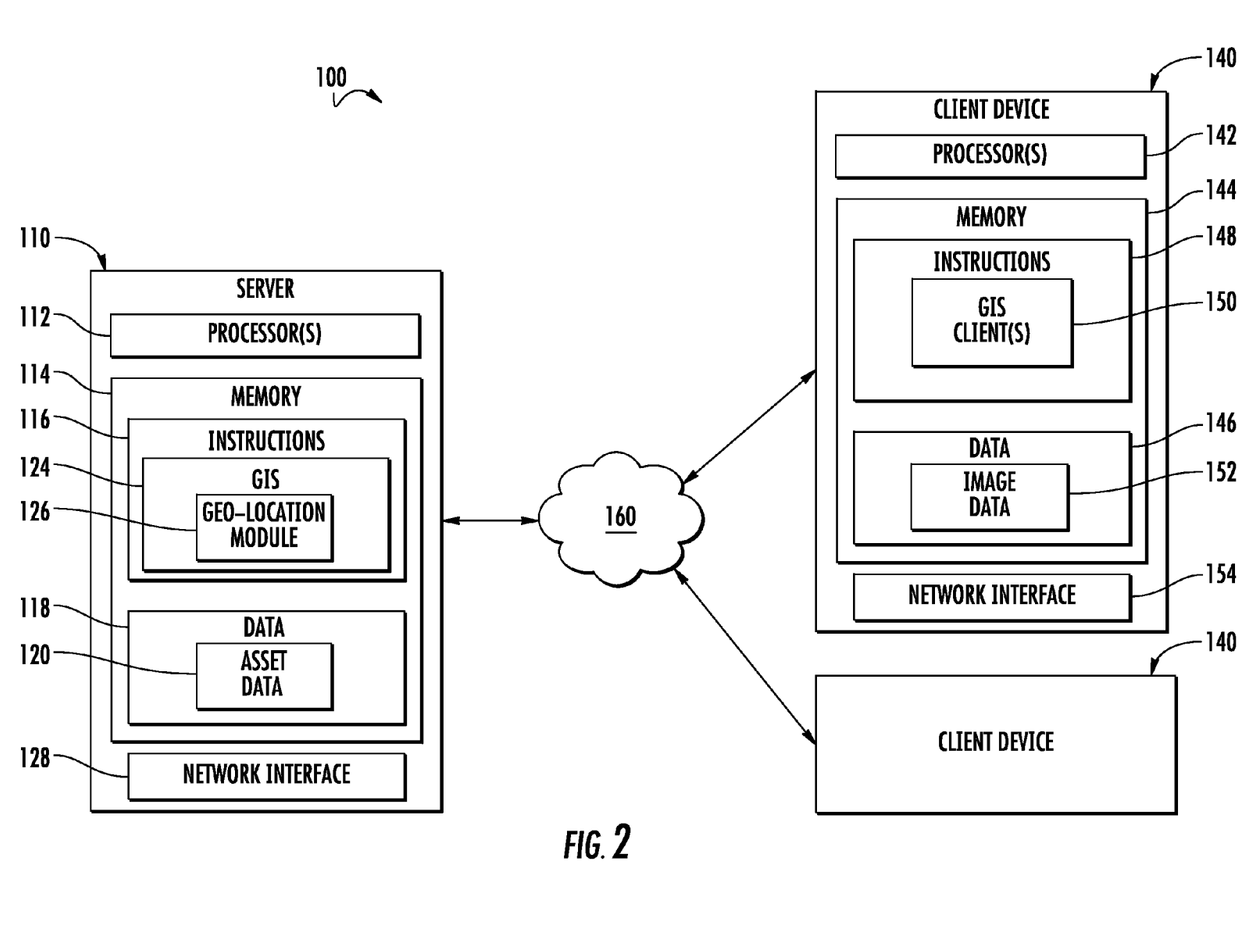
FIG. 2 illustrates a schematic view of one embodiment of a system for geo-locating images in accordance with aspects of the present subject.

Referring now to FIG. 2, one embodiment of a system 100 for geo-locating images is illustrated in accordance with aspects of the present subject matter. As shown in FIG. 2, the system 100 may include a client-server architecture where a server 110 communicates with one or more clients, such as a local client device 140, over a network 160. The server 110 may generally be any suitable computing device, such as a remote web server(s) or a local server(s), and/or any suitable combination of computing devices. For instance, the server 110 may be implemented as a parallel or distributed system in which two or more computing devices act together as single server. Similarly, the client device 140 may generally be any suitable computing device(s), such as a laptop(s), desktop(s), smartphone(s), tablet(s), mobile device(s), wearable computing device(s), a display with one or more processors coupled thereto and/or embedded therein and/or any other computing device(s). Although only two client devices 140 are shown in FIG. 2, it should be appreciated that any number of clients may be connected to the server 110 over the network 160.

In several embodiments, the server 110 may host a GIS 124, such as a mapping application (e.g. the Google Maps mapping services provided by Google Inc.), a virtual globe application (e.g. the Google Earth virtual globe application provided by Google Inc.), or any other suitable geographic information system. On the client-side, the client device 140 may present a user interface that allows a user to interact with the GIS 124. For instance, the user interface may be served through a network or web-based application that is executed on the client device 140, such as a web browser, a thin client application or any other suitable network or web-based application or the user interface may be served locally on the client device 140. The server 110 may transmit asset data, such as satellite and/or aerial imagery and other geospatial data (e.g., terrain and vector data), over the network 160 to the client device 140. Upon receipt of this data, the client device 140 may render the asset data, via the user interface, in the form a map (e.g., 2-D map or a 3-D map) that is displayed on a display device associated with the client device 140. A user may then access and/or interact with the map presented in the user interface. For instance, as indicated above with reference to FIG. 1, the user may be allowed to move a user icon across the map displayed within the user interface in order to select a desired geographic location for geo-locating one or more images.

As shown in FIG. 2, the server 110 may include a processor(s) 112 and a memory 114. The processor(s) 112 may be any suitable processing device, such as a microprocessor, microcontroller, integrated circuit, or other suitable processing device. Similarly, the memory 114 may include any suitable computer-readable medium or media, including, but not limited to, non-transitory computer-readable media, RAM, ROM, hard drives, flash drives, or other memory devices. The memory 114 may store information accessible by processor(s) 112, including instructions 116 that can be executed by processor(s) 112 and data 118 that can be retrieved, manipulated, created, or stored by processor(s) 112. In several embodiments, the data 118 may be stored in one or more databases.

For instance, as shown in FIG. 2, the memory 114 may include an asset database 120 storing asset data associated with one or more geospatial assets capable of being served to the client device 140 by the server 110 (e.g., via the GIS 124). For instance, the asset data may correspond to any suitable data or information associated with a given geospatial asset, such as image data, vector data, terrain data, layer data, search data and/or the like. Such asset data may include entity information associated with the geographic entities used to define specific geographic regions and/or locations within the geospatial asset. For example, the entity data may be organized or structured so that each geographic location within a specific geospatial asset is associated with a given set of geographic entities (e.g., a hierarchically ordered set of geographic entities for each location).

Additionally, as indicated above, the server 110 may, in several embodiments, be configured to host a GIS 124 that allows the server to communicate with a corresponding GIS client(s) 150 running on the client device 140. Thus, in response to access requests transmitted by the client device 140, asset data associated with one or more geospatial assets, including satellite and/or aerial imagery, may be transmitted to and rendered by the client device 140 to allow a user to navigate and/or interact with the geospatial asset(s).

As shown in FIG. 2, in several embodiments, the instructions 116 stored within the memory 114 may be executed by the processor(s) 112 to implement a geo-location module 126 associated with the GIS 124. In general, the geo-location module 126 may be configured to allow a user to geo-locate one or more selected images on a map displayed to the user via a suitable user interface. For instance, the geo-location module 126 may be configured to provide a user interface for presentation on the client device 140 (e.g., user interface 10 of FIG. 1) that allows the user to select one or more images to be geo-located on the displayed map and/or to select a desired geographic location for geo-locating such image(s) on the map. In addition, the geo-location module 126 may be configured to track the position of a user icon (e.g., icon 28 of FIG. 1) presented on the map as the icon is moved across the map in response to inputs provided by the user. Thus, by tracking the position of the user icon as it is moved relative to the map, the geo-location module 126 may be configured to determine the current geographic location of the icon on the map. A textual representation identifying the current geographic location may then be provided for presentation to the user in order to assist the user in selecting a desired location for geo-locating the image(s).

It should be appreciated that, although the geo-location module 126 is shown as being implemented by the server 110, one or more of the functions provided by the module may, in alternative embodiments, by implemented by the client device 140. For instance, as indicated above, the asset data served to the client device 140 may include geographic entity data associated with the geographic locations included within the map displayed to the user. In such an embodiment, a geo-location module implemented by the client device 140 may be configured to track the position of an associated user icon as it is moved relative to the displayed map, thereby allowing for the client device 140 to present a location indicator to the user providing a textual representation of the current geographic location of the icon on the map.

It should also be appreciated that, although the geo-location module 126 is shown as forming part of the hosted GIS 124, the geo-location module 126 may, in other embodiments, be a stand-alone module or form part of any other suitable software package that utilizes data provided by the GIS 124 to allow for one or more images to geo-located. For example, in one embodiment, the geo-location module 126 may form part of an image-related software package designed to allow users to store, organize and/or share images, including geo-coded images.

Moreover, it should be appreciated that, as used herein, the term "module" refers to computer logic utilized to provide desired functionality. Thus, a module may be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

As shown in FIG. 2, the server 110 may also include a network interface 128 for providing communications over the network 160. In general, the network interface 128 may be any device/medium that allows the server 110 to interface with the network 160.

Similar to the server 110, the client device 140 may also include one or more processors 142 and associated memory 144. The processor(s) 142 may be any suitable processing device known in the art, such as a microprocessor, microcontroller, integrated circuit, or other suitable processing device. Similarly, the memory 144 may be any suitable computer-readable medium or media, including, but not limited to, non-transitory computer-readable media, RAM, ROM, hard drives, flash drives, or other memory devices. As is generally understood, the memory 144 may be configured to store various types of information, such as data 146 that may be accessed by the processor(s) 142 and instructions 148 that may be executed by the processor(s) 142. The data 146 may generally correspond to any suitable files or other data that may be retrieved, manipulated, created, or stored by processor(s) 142. In several embodiments, the data 146 may be stored in one or more databases.

For instance, as shown in FIG. 2, the memory 144 may include an image database 152 for storing data associated with one or more images. This data may include, for example, image files containing metadata associated with each image. As is generally understood, the metadata of an image file may include various types of information, such as information related to the model and/or serial number of the camera used to capture the image and/or information related to the camera settings. In addition, for a geo-coded image, the metadata may include geo-location data corresponding to a specific geographic location associated with the image (e.g., the location at which the image was captured). In accordance with aspects of the present subject matter, this geo-location data may be coded within the metadata of an image file in response to a user selecting a geographic location for geo-locating the associated image. Specifically, upon the selection of the desired geographic, the image file may be geo-coded with information defining the selected location (e.g., by geo-coding the image file with a set GPS coordinates corresponding to the selected location). The geo-coded image files may then allow the corresponding images to be organized and/or viewed according to their geographic locations.

Additionally, the instructions 148 stored within the memory 144 of the client device 140 may generally be any set of instructions that, when executed by the processor(s) 142, cause the processor(s) 142 to provide desired functionality. For example, the instructions 148 may be software instructions rendered in a computer readable form or the instructions may be implemented using hard-wired logic or other circuitry. In several embodiments, suitable instructions may be stored within the memory 144 for implementing one or more GIS clients 150, such as one or more earth-browsing clients and/or mapping clients, designed to render the asset data (including satellite and/or aerial imagery) associated with the geospatial assets available via the GIS 124. For instance, the GIS client(s) 150 may be configured to retrieve asset data from the server 110 and render such data in the form of a map(s) for display/use by the user. Specifically, as described above with reference to FIG. 1, a map displaying a portion of a geospatial asset may be presented to the user within a suitable user interface, which may then allow the user to identify a given location on the map for geo-locating one or more selected images.

Moreover, as shown in FIG. 2, the client device 140 may also include a network interface 154 for providing communications over the network 160. Similar to the interface 128 for the server 110, the network interface 154 may generally be any device/medium that allows the client device 140 to interface with the network 160.

It should be appreciated that the network 160 may be any type of communications network, such as a local area network (e.g. intranet), wide area network (e.g. Internet), or some combination thereof. The network can also include a direct connection between the client device 140 and the server 110. In general, communication between the server 110 and the client device 140 may be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Example Methods for Geo-Locating Images

Figure 3:
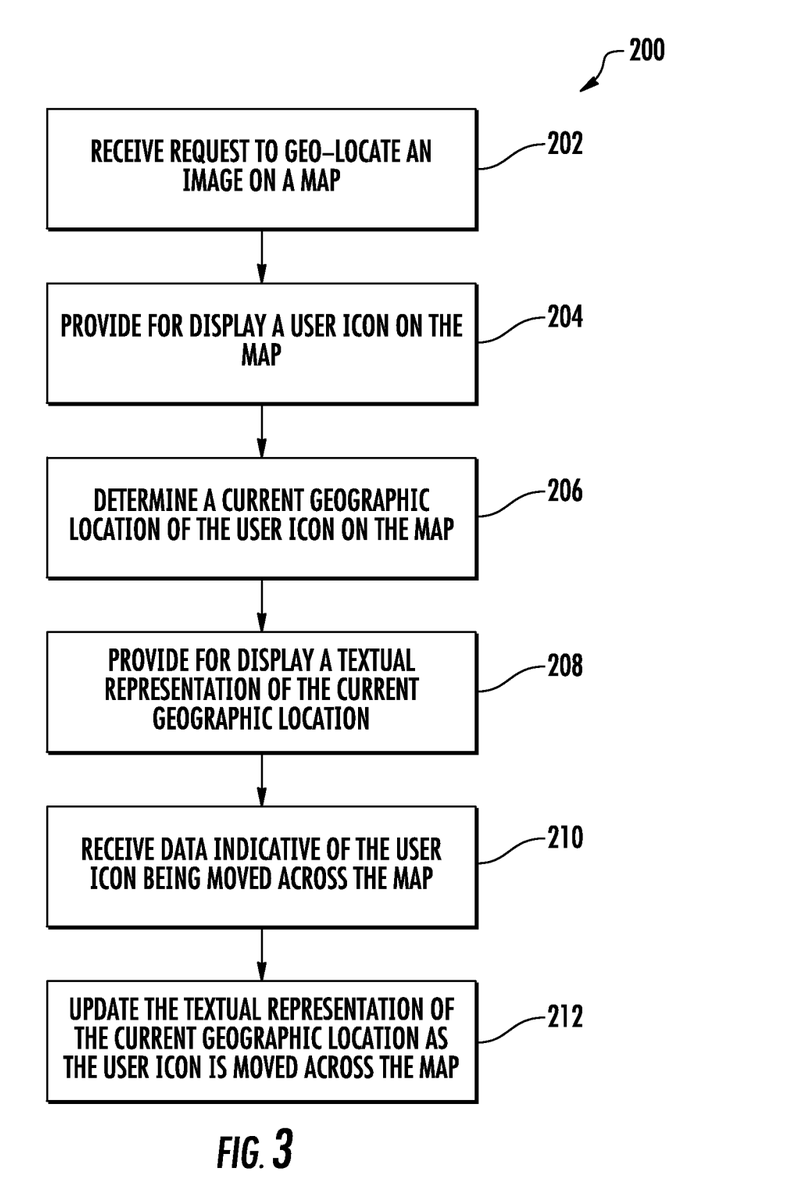
FIG. 3 illustrates a flow diagram of one embodiment of a method for geo-locating images in accordance with aspects of the present subject matter.

Referring now to FIG. 3, a flow diagram of one embodiment of a method 200 for geo-locating images is illustrated in accordance with aspects of the present subject matter. The method 200 will generally be discussed herein with reference to the system 100 shown in FIG. 2. However, those of ordinary skill in the art, using the disclosures provided herein, should appreciate that the methods described herein may be executed by any computing device or any combination of computing devices. Additionally, it should be appreciated that, although the method blocks 202-212 are shown in FIG. 3 in a specific order, the various blocks of the disclosed method 200 may generally be performed in any suitable order that is consistent with the disclosure provided herein.

As shown in FIG. 3, at (202), the method 200 includes receiving a request to geo-locate an image(s) on a map displayed to the user. In general, the request may be received in response to any suitable user input that provides an indication of the user's intent to geo-locate one or more images. For instance, referring to the example shown in FIG. 1, the user may indicate that he/she desires to geo-locate one or more images by selecting one or more of the image icons 26 displayed within the image sidebar 24. In other embodiments, the request to geo-locate the image(s) may be initiated via any other suitable user input.

Additionally, at (204), the method 200 includes providing for display a user icon on the map in response to the request to geo-locate the image(s). As indicated above, the user icon may generally correspond to any suitable icon that provides a visual representation of the user's current input location on the displayed map. For instance, in one embodiment, the image icon may correspond to a pointer icon (e.g., icon 30 of FIG. 1) and/or an image icon (e.g., icon 32 of FIG. 1).

It should be appreciated that, in several embodiments, the user icon displayed to the user in response to the geo-location request may be the same user icon that was being displayed to the user prior to receipt of such request (e.g., by continuing to display the pointer icon typically displayed to the user to indicate his/her current input location on the display screen).

Alternatively, the user icon may be altered upon receipt of the geo-location request. For instance, after receiving the geo-location request, the user icon may be changed from a pointer icon to an image icon or to a combination of both pointer and image icons (e.g., as shown in FIG. 1).

At (206), the method 200 includes determining a current geographic location of the user icon on the map. Specifically, in several embodiments, the currently displayed position of the user icon over the map may be correlated to a specific geographic location on the map. For example, the user icon may include an active point (e.g., at the tip of the pointer icon, such as that shown at points 302, 304 and 306 in FIG. 6) that corresponds to the actual input location of the user icon within the user interface. Thus, by determining the position of this active point relative to the map, the corresponding geographic location of the user icon on the map may be determined.

Moreover, at (208), the method 200 includes providing for display a textual representation of the current geographic location of the user icon on the map. As indicated above, the textual representation may generally correspond to any suitable textual information that provides an indication of the user's input location on the map, such as by containing one or more geographic entities and/or GPS coordinates associated with the geographic location and/or any other suitable information. For example, as shown in the example of FIG. 1, the textual representation includes geographic entities listed in a hierarchical order (e.g., country, state, city, street).

It should be appreciated that, when the textual representation corresponds to one or more geographic entities associated with the geographic location of the user icon on the map, the specific entities included within the textual representation may vary depending on one or more factors. In one embodiment, the user may be allowed (e.g., via user settings) to define which geographic entities are to be contained within the textual representation. For example, the user may specify that the textual representation always include the state, city and street address associated with the geographic location of the user icon.

In another embodiment, the geographic entities included within the textual representation may vary depending on the current zoom level of the map. For instance, as indicated above, the geographic entities may be ranked or ordered based on the size of the geographic area defined by each entity, such as by ranking the geographic entity defining the largest geographic area (e.g., a continent) highest and by ranking the geographic entity defining the smallest geographic area (e.g., a street address) lowest. In such an embodiment, when the map view is highly zoomed-out (e.g., such that that an entire continent or country may be viewed), only geographic entities at the upper end of the hierarchy may be displayed to the user (e.g., country and state). However, when the map view is highly zoomed-in (e.g., such that a specific road and/or road network may be viewed), only geographic entities at the lower end of the hierarchy may be displayed to the user (e.g., city and/or street address).

Figure 4:
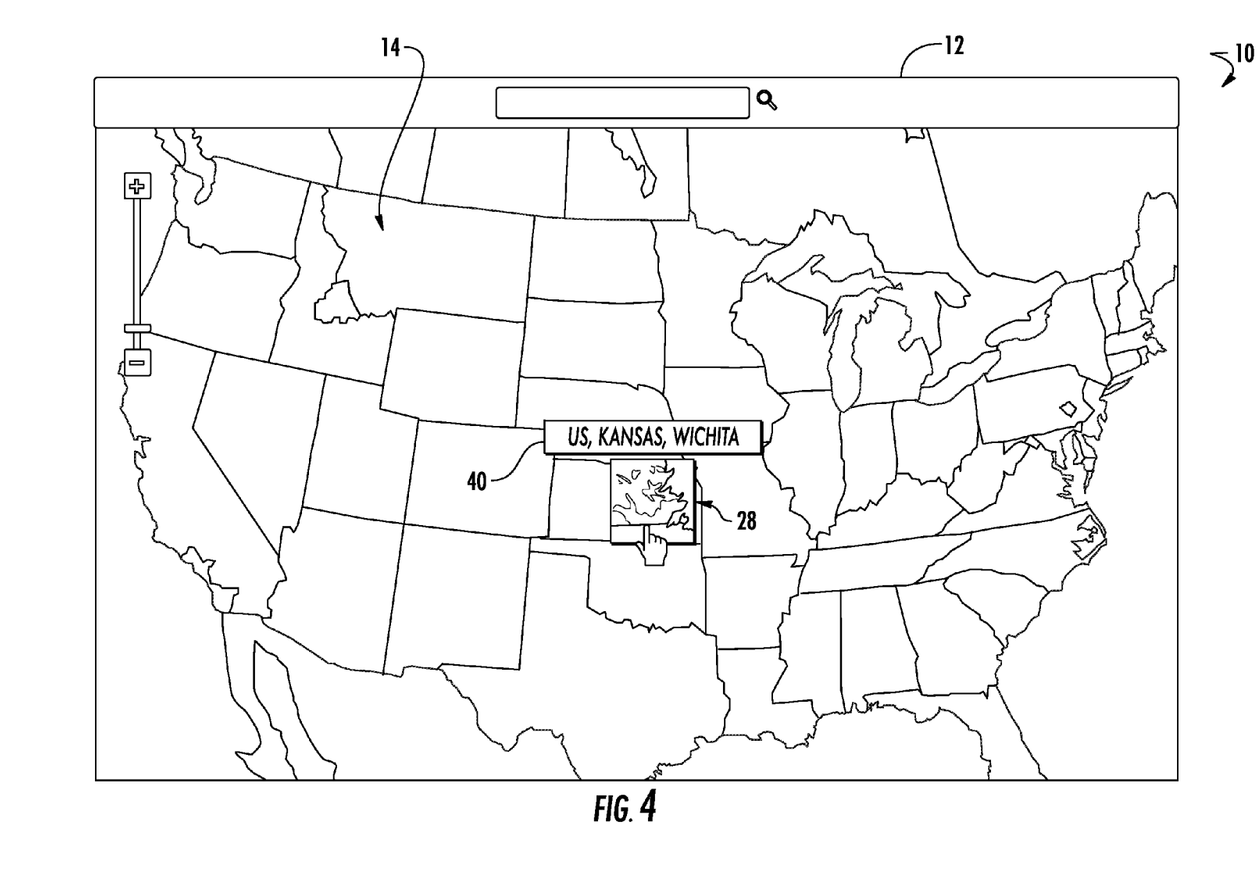
FIG. 4 illustrates another example view of a suitable user interface for displaying a map that allows a user to select a geographic location on the map for geo-locating one or more images, particularly illustrating one example of the geographic entities that may be included within the location indicator when the current zoom level of the map is significantly zoomed-out.
Figure 5:
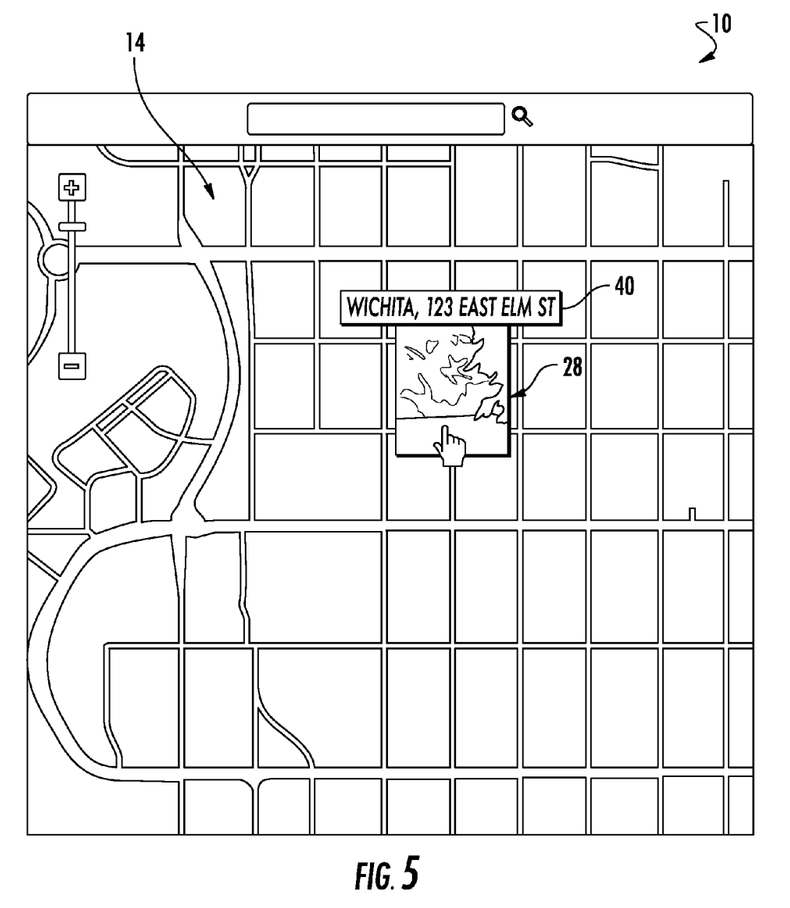

For instance, FIGS. 4 and 5 illustrate an example of how the geographic entities included within the textual representation may be varied depending on the current zoom level of the map 14. As shown, the user icon 28 is positioned on the map 14 at the exact same location in both FIGS. 4 and 5. However, given the significantly different zoom levels depicted in such figures, the geographic entities contained within the textual representation defined by the location indicator 40 may be varied to account for the level of detail shown in the current map view presented to the user within the user interface 10. For instance, FIG. 4 illustrates the map 14 significantly zoomed-out (e.g., such that the entire United States can be viewed by the user). As such, the textual representation may only contain geographic entities at the upper end of the hierarchy, such as the country, state and city over which the user icon is positioned. However, the map 14 is significantly zoomed-in in FIG. 5 (e.g., such that a specific road network can be viewed). Thus, the textual representation may only contain geographic entities at the lower end of the hierarchy, such as the city and specific street address over which the user icon is positioned. Of course, it should be appreciated that, in alternative embodiments, various other combinations of geographic entities may be included within the textual representation presented to the user based on the current zoom level of the map 14.

Referring back to FIG. 3, at (210), the method includes receiving data indicative of the user icon being moved across the map. As indicated above, the user icon may be moved across the map using any suitable input device integrated into or otherwise communicatively coupled to the user's computing device, such as a mouse, mouse pad, touch screen and/or any other suitable device. Thus, data indicative of the user icon being moved may be received in response to the user providing a suitable user input intended to cause the position of the user icon to be changed on the user's display.

Additionally, at (212), the method 200 includes updating the textual representation of the current geographic location of the user icon as it is moved across the map. Specifically, as indicated above, the textual representation may be used to provide the user a visual reference regarding the exact location of the user icon while the user is attempting to select a geographic location on the map for geo-locating one or more images. Thus, by updating the textual representation as the user icon is moved across the map, the user may reference the information provided within the textual representation in order to accurately geo-locate the selected image(s).

Figure 6:
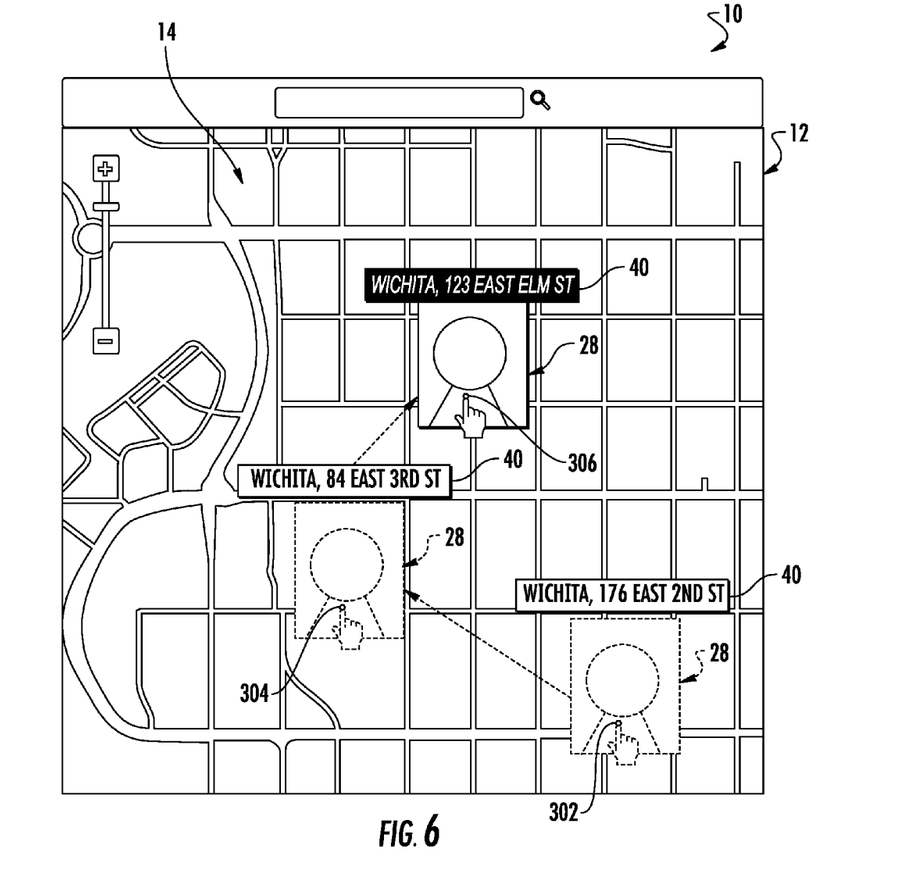
FIG. 6 illustrates yet another example view of the user interface shown in FIG. 4, particularly illustrating the location indicator being updated as the user icon is moved across the portion of the map currently displayed to the user.

In several embodiments, the information contained within the textual representation (e.g., the geographic entity(ies)) may be updated continuously with the movement of the user icon across the map. For instance, FIG. 6 illustrates a user icon 28 as it is moved across a map 14 between three different locations (e.g., a first location indicated at point 302, a second location indicated at point 304 and a third location indicated at point 306). In such instance, the information contained within the textual representation may be adjusted simultaneously with movements of the user icon 28 to account for changes in the geographic location of the icon 28 relative to the map 14. For instance, in the embodiment shown in FIG. 6, the street address shown within the location identifier 40 may be continuously updated as the user icon 28 is moved from the first position 302 to the second position 304 and from the second position 306 to the third position 306. In other words, the street address may be continuously updated such that the textual representation accurately reflects the exact street address over which the user icon 28 is positioned as the icon 28 is moved between the respective positions 302, 304, 306.

Further Example Embodiments for Geo-Locating Images

In a specific embodiment of the present subject matter, the information contained within the textual representation may only be configured to be updated when the user icon is being moved across the map at a speed that is less than a predetermined speed threshold. Thus, at speeds lower than the predetermined speed threshold, the information contained within the textual representation may be continuously updated as the user icon is moved across the map. However, if the user icon is moved across the map at a speed exceeding the predetermined speed threshold, the information contained within the textual representation may, for example, be held constant until the speed at which the user icon is being moved falls below the threshold.

Figure 7:
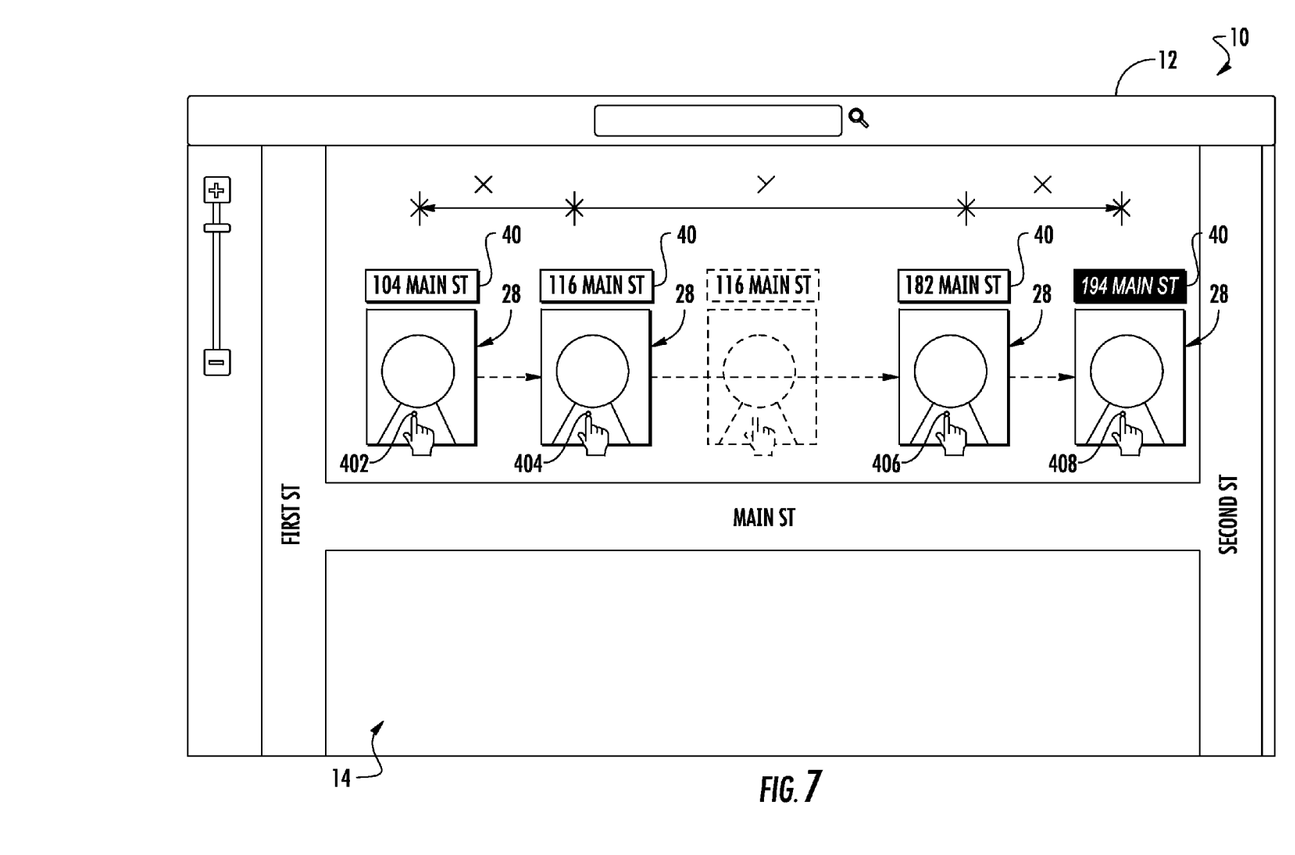
FIG. 7 illustrates a further example view of the user interface shown in FIG. 4, particularly illustrating the location indicator being updated when the user icon is moved across the portion of the map currently displayed to the user at speeds lower than a predetermined speed threshold.

For instance, FIG. 7 illustrates an example of a user icon 28 being moved across a map 14 between four different locations (e.g., a first location indicated at point 402, a second location indicated at point 404, a third location indicated at point 406 and a fourth location indicated at point 408). For purposes of explanation, it will be assumed that the user icon 28 is moved across the map 14 over a screen distance X defined between the first and second locations 402, 404 and between the third and fourth locations 406, 408 at a first speed that is smaller than the predetermined speed threshold and that the user icon 28 is further moved across the map 14 over a screen distance Y defined between the second and third locations 404, 406 at a second speed that is larger than the predetermined speed threshold. In such an embodiment, the information contained within the textual representation (e.g., the street address) may be continuously updated with each respective street address defined between the first and second locations 402, 404 as the icon 28 is moved between such locations 402, 404. However, due to the excessive speed between the second and third locations 404, 406, the information contained within the textual representation is not updated as the user icon 28 is moved between such locations 404, 406. For instance, as shown in FIG. 7, the textual representation may continue to contain the information last updated at the location at which the speed of the user icon 28 was below the speed threshold (e.g., the information associated with the second location 404). Once the speed is again reduced below the speed threshold at the third location 406, the information contained within the textual representation may be updated with the current geographic location of the user icon 28. Thereafter, given the slower speed, the textual representation may be continuously updated as the user icon 28 is moved between third and fourth locations 406, 408.

It should be appreciated that the speed of the user icon 28 may generally be determined with reference to both the screen distance over which the icon 28 is moved between two separate locations on the map 14 and the time taken to move such distance. Referring to the example shown in FIG. 7, each screen distance X, Y may correspond to, for example, a distance between two locations on the map 14 defined relative to the dimensions of the display window 12 within which the map 12 is being presented rather than the actual, geographic distance defined between such locations. As such, the calculated speed may not be dependent upon the zoom level of the current map view.

It should also be appreciated that, in alternative embodiments, the textual representation displayed to the user may be updated non-continuously or only periodically. For instance, in a particular embodiment, the information contained within the textual representation may only be configured to be updated when the user icon is not moved relative to the map or otherwise stopped for longer than a predetermined period of time (e.g., 0.5 second). Thus, in the example shown in FIG. 6, if the user icon 28 was initially positioned at the first location 302 and was continuously moved from the first location 302 to the second location 304 and then to third location 306 without stopping, the textual representation may not be updated until the user icon 28 was held at the third location 306 (or at any other location) for the required time period. In such instance, the initial information included within the textual representation (e.g., the information associated with the first location 302) may continue to be presented to the user until the user icon 28 is maintained at given location on the map 14 for the predetermined period of time. However, if the movement of the user icon 28 was instead paused for the required time period at the second location 304 prior to moving the icon 28 to the third location 306, the textual representation may be updated to include information associated with the second location 302.

As indicated above, once the user identifies and selects the desired geographic location on the map, the corresponding image(s) may be coded with data associated with the selected location. For example, GPS coordinates corresponding to the selection location may be stored within the metadata of the image file(s) associated with the image(s).

Moreover, in several embodiments, a visual parameter associated with textual representation displayed to the user may be modified when the user selects the desired location on the map, thereby providing the user with a visual indication that the corresponding image(s) will be geo-coded with data associated with the selected location. In doing so, the modified visual parameter may generally correspond to any suitable parameter that changes the appearance of the textual representation being displayed to the user, such as the color, transparency, font and/or texture of the textual representation. For instance, as shown in FIG. 6, the color and font of the textual representation included within the location identifier 40 has been modified at the third location 306 to indicate the user's selection of such location on the map 14. A similar modification of the textual representation is shown, for example, in FIG. 7 to indicate the user's selection of the geographic location defined at the fourth location 408.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:
1. A computer-implemented method for geo-locating images, the method comprising:
    receiving, by one or more computing devices, a request to geo-locate an image on a map;
    in response to the request, providing for display, by the one or more computing devices, a user icon on the map;
    determining, by the one or more computing devices, a current geographic location of the user icon on the map;
    providing for display, by the one or more computing devices, a textual representation of the current geographic location;
    receiving, by the one or more computing devices, data indicative of the user icon being moved across at least a portion of the map;
    receiving, by the one or more computing devices, data indicative of a speed at which the user icon is being moved across the at least a portion of the map; and
    when the speed is less than a predetermined speed threshold, continuously updating, by the one or more computing devices, the textual representation of the current geographic location simultaneously with the user icon being moved across the at least a portion of the map from a first location to a second location such that the current geographic location included within the textual representation is updated to temporarily display each of a plurality of intermediate locations between the first and second locations as the user icon is moved across each intermediate location.

2. The computer-implemented method of claim 1, wherein the current geographic location is associated with a hierarchy of geographic entities.

3. The computer-implemented method of claim 2, further comprising:
   determining, by the one or more computing devices, a current zoom level associated with the map; and
   selecting, by the one or more computing devices, a portion of the hierarchy of geographic entities for display within the textual representation based on the current zoom level associated with the map.

4. The computer-implemented method of claim 2, wherein the hierarchy of geographic entities includes two or more of a continent, country, state, province county, city district, street or street address associated with the current geographic location.

5. The computer-implemented method of claim 1, further comprising:
   receiving, by the one or computing devices, a request to associate the image with a selected geographic location on the map; and
   in response to the request, generating, by the one or more computing devices, data to be associated with the image that corresponds to the selected geographic location.

6. The computer-implemented method of claim 5, further comprising, in response to the request, providing for display, by the one or more computing devices, a modified textual representation associated with the selected geographic location, the modified textual representation having a visual parameter differing from a visual parameter of the textual representation.

7. The computer-implemented method of claim 6, wherein the visual parameter comprises at least one of color, transparency, font or texture.

8. A system for geo-locating images, the system comprising:
   one or more computing devices including one or more processors and associated memory, the memory storing instructions that, when executed by the one or more processors, configure the one or more computing devices to:
      transmit data associated with presenting a map of a geospatial asset, the map including a user icon displayed thereon;
      determine a current geographic location of the user icon on the map;
      provide for display a textual representation of the current geographic location;
      receive data indicative of the user icon being moved across at least a portion of the map;
      receive data indicative of a speed at which the user icon is being moved across the at least a portion of the map; and
      when the speed is less than a predetermined speed threshold, continuously update the textual representation of the current geographic location provided for display simultaneously with the user icon being moved across the at least a portion of the map from a first location to a second location such that the current geographic location included within textual representation is undated to temporarily display each of a plurality of intermediate locations between the first and second locations as the user icon is moved across each intermediate location.

9. The system of claim 8, wherein the current geographic location is associated with a hierarchy of geographic entities, wherein the one or more computing devices are further configured to receive data indicative of a current zoom level associated with the map and select a portion of the hierarchy of geographic entities to be provided for display within the textual representation based on the current zoom level associated with the map.

10. The system of claim 8, wherein the one or more computing devices are further configured to receive a request to associate an image with a selected geographic location on the map.

11. The computer-implemented method of claim 1, further comprising, when the speed is greater than the predetermined speed threshold, maintaining the current geographic location included within the textual representation constant until the speed falls below the predetermined speed threshold.

12. The system of claim 8, wherein, when the speed is greater than the predetermined speed threshold, the one or more computing devices are configured to maintain the current geographic location included within the textual representation constant until the speed falls below the predetermined speed threshold.

13. The system of claim 9, wherein the hierarchy of geographic entities includes two or more of a continent, country, state, province county, city district, street or street address associated with the current geographic location.

14. The system of claim 10, wherein, in response to the request, the one or more computing device are configured to generate data to be associated with the image that corresponds to the selected geographic location.

15. The system of claim 10, wherein, in response to the request, the one or more computing devices are configured to provide for display a modified textual representation associated with the selected geographic location, the modified textual representation having a visual parameter differing from a visual parameter of the textual representation.

16. The system of claim 15, wherein the visual parameter comprises at least one of color, transparency, font or texture.

* * * * *